United States Patent
Groux

(10) Patent No.: US 7,206,250 B2
(45) Date of Patent: Apr. 17, 2007

(54) METHOD FOR STORING DATA BLOCKS IN A MEMORY

(75) Inventor: Cédric Groux, Chexbres (CH)

(73) Assignee: Nagracard S.A., Cheseaux-Sur-Lausanne (CH)

( * ) Notice: Subject to any disclaimer, the term of this patent is extended or adjusted under 35 U.S.C. 154(b) by 355 days.

(21) Appl. No.: 10/505,151

(22) PCT Filed: Feb. 18, 2003

(86) PCT No.: PCT/IB03/00621

§ 371 (c)(1),
(2), (4) Date: Aug. 20, 2004

(87) PCT Pub. No.: WO03/071430

PCT Pub. Date: Aug. 28, 2003

(65) Prior Publication Data

US 2005/0099867 A1    May 12, 2005

(30) Foreign Application Priority Data

Feb. 20, 2002    (CH) .................................... 0294/02

(51) Int. Cl.
*G11C 8/00*    (2006.01)
(52) U.S. Cl. .................. 365/230.03; 365/195; 711/114
(58) Field of Classification Search ................ 365/195, 365/230.03; 711/114, 119
See application file for complete search history.

(56) References Cited

U.S. PATENT DOCUMENTS

| | | | |
|---|---|---|---|
| 5,568,423 A | 10/1996 | Jou et al. | |
| 6,041,001 A * | 3/2000 | Estakhri | ..................... 365/200 |
| 6,115,799 A | 9/2000 | Ogawa | |
| 6,249,802 B1 | 6/2001 | Richardson et al. | |
| 6,408,359 B1 * | 6/2002 | Ito et al. | ..................... 711/114 |
| 6,584,541 B2 * | 6/2003 | Friedman et al. | ........... 711/103 |
| 6,687,767 B2 * | 2/2004 | Butterfield | ................... 710/22 |
| 6,711,588 B1 * | 3/2004 | Yamanaka et al. | ....... 707/104.1 |
| 6,938,140 B2 * | 8/2005 | Louie et al. | ................ 711/165 |
| 2003/0229753 A1 * | 12/2003 | Hwang | ....................... 711/103 |

FOREIGN PATENT DOCUMENTS

WO    WO 00 36511    6/2000

OTHER PUBLICATIONS

Biget, et al., "How smart cards can benefit from object-oriented technologies", Future Generations Computer Systems, Elsevier Science Publishers, Amsterdam, Netherlands, vol. 13, No. 1, pp. 75-90, Abstract Only, Jul. 1, 1997.

* cited by examiner

*Primary Examiner*—Richard T. Elms
*Assistant Examiner*—Hien N Nguyen
(74) *Attorney, Agent, or Firm*—DLA Piper US LLP

(57) ABSTRACT

A method for storing of a plurality of data blocks in a digital rewritable memory of semiconductors controlled by a memory manager and includes the steps of: randomly determining an available area; and storing the data block in the area determined in the determining step. This method of data storage is preferably applied to chip cards and to similar electronic modules. It prevents the reproduction of the functionalities of the card after an analysis of the contents of the memory. Furthermore, it assures a better distribution of the wearing of the memory.

20 Claims, 2 Drawing Sheets

| B1 | e1 | B4 | B6 | B5 | e2 | B8 | B3 | e3 | B7 | e4 | B2 |
|----|----|----|----|----|----|----|----|----|----|----|----|
|    |    |    |    |    | e2,1 | e2,2 |  |  |  |  |  |

| B1 | e1 | B4 | B6 | B5 | e2 | B8 | B3 | e3 | B7 | e4 | B2 |
|----|----|----|----|----|-----|----|----|----|----|----|----|
| |← l →| | | | e2,1 | e2,2 | | | | | | |

Fig. 1

| e1 | B2 | e2 | B4 | e3 | B6 | e4 | B3 | B1 | B8 | e5 | B5 | B7 | e6 | B10 | e7 | B9 | e8 |
|----|----|----|----|----|----|----|----|----|----|----|----|----|----|----|----|----|----| a)

| e10 | B6 | e4 | B3 | B1 | B8 | e5 | B5 | B7 | e9 | B9 | e8 |
|-----|----|----|----|----|----|----|----|----|----|----|----| b)

| e11 | B13 | B6 | B12 | B3 | B1 | B8 | e5 | B5 | B7 | B11 | B9 | e8 |
|-----|-----|----|-----|----|----|----|----|----|----|-----|----|----| c)

Fig. 2

| e1 | B2 | e2 | B3 | e3 | B5 | e4 |
|----|----|----|----|----|----|----| a)

| e1 | B2 | e5 | B6 | e6 | B3 | e3 | B5 | B7 | e7 |
|----|----|----|----|----|----|----|----|----|----|
| | |←  m  →| | | | | |←  m  →| | b)

Fig. 3

METHOD FOR STORING DATA BLOCKS IN A MEMORY

This invention relates to the field of data storage in a re-writable digital memory of semiconductors that keeps its contents in cases where the power supply is interrupted. More particularly, the invention relates to the management of the memory space available by means of a storage method for data blocks in the memory.

The semiconductor memories are used in all the applications that comprise microprocessors, for which it is necessary to store the program and the necessary data for their functioning.

The data are introduced, in general, in the memory in predetermined addresses, namely, defined during the development of the program, or sequentially, namely, by successive blocks following the blocks already present in the memory. Likewise these blocks can be re-recorded on other blocks that are already present, in order to renew the data that have become obsolete. A block is a sequence of bits or bytes of predetermined length or size that includes a header containing a block identifier and a number defining its length.

According to the instructions of the program, the data are stored in the memory in positions defined by addresses. The latter are determined by means of parameters contained in the program. These reserved positions are situated in any area of the memory whose limits are defined by a field of addresses. This range, determined in this way, corresponds to the capacity available that is, in general, greater than the maximum quantity of data that can be stored in it.

Numerous applications of more and more sophisticated data processing are installed on smaller and smaller physical mediums. Therefore, the capacity of the memories used for microprocessors must be optimized to the maximum. These cases appear for example in different modules of electronics like smart cards or in any other medium that includes numerical processing components of miniaturized data.

Some applications, particularly access control ones, user identification ones or those of electronic payment, must respond to more and more safety demands in order to avoid fraud. Indeed, the functions of a card can be revealed after deep analysis of the contents of the memory associated to the processor. For example, the debit mechanism of a payment card produces a set of data that are stored in positions of the memory, which are predetermined by the program. For each operation done by the card, a well-defined configuration of the data in the memory corresponds to it. This situation leaves a door open to piracy of the cards whose functionalities can be copied or simulated onto other cards.

The object of the present invention is to propose a protected storage method for data in a memory so as to avoid falsifications of their contents by analysis. Another object consists in limiting the wearing of the memory by means of improved management of the data reading/writing cycles.

This objective is achieved thanks to a storage method of a plurality of data blocks in a digital re-writable memory of semiconductors controlled by a memory manager and characterized by the following steps that consist of:
randomly determining an available area,
storing the data block in the area chosen in this way.

By "available area" one understands an area of the memory that is free of data or that contains data replaceable by new ones like in case of an updating for example.

The method according to the invention allows the storage of data blocks in positions of the memory that are always different although the program carries out a series of identical operations. For example, a 10 units debit operation on a card will not have the same effect on the memory contents structure at each execution of the same debit function. Furthermore, two identical cards that carry out an identical operation will have a completely different structure in the contents of their memory. In this way, an analysis of the data of a card will not allow one to reproduce an image of the operations of the first card with the other and vice versa.

Besides the aspect relative to security, the method of the invention allows, thanks to the reading/writing in randomly chosen areas, better distribution of the wearing of the memory. Therefore there will not be areas in the memory that are worn out more quickly than others, like when numerous data reading/writing cycles are carried out always in an assigned place of the memory.

The random selection of an available memory area can be carried out according to different variants:

1 The result obtained after the exploration of the memory constitutes a list of addresses corresponding to the available areas. This list is kept temporarily in a random access memory. Afterwards an address is randomly chosen from this list, and then the data block is stored in the area of the memory indicated by this address. A variant of this method consists in continually maintaining a table with the available areas and randomly choosing an address among them.

2 Exploration of the memory determines the maximum number of available areas. A random selection of a number n between 1 and the number of areas found designates the area where the block must be stored. For example, there are 20 areas available, the random selection of a number between 1 and 20 gives 8, the block is therefore stored in the eighth available area.

3 A number N is randomly determined between 1 and the maximum number of areas possible. The memory manager sequentially searches said $N^{th}$ available area, and if it reaches the end of the memory before finding this area, the memory manager restarts the search from the beginning of the memory until the $N^{th}$ available area is found.

The invention will be better understood thanks to the following detailed description that relates to the attached figures given as a non-limiting example, that are:

FIG. 1 shows the storage of some data blocks with the same length in a portion of the memory.

FIG. 2 shows the storage of variable length blocks.

FIG. 3 illustrates the storage of blocks taking a predetermined gap into account.

Figure 4:
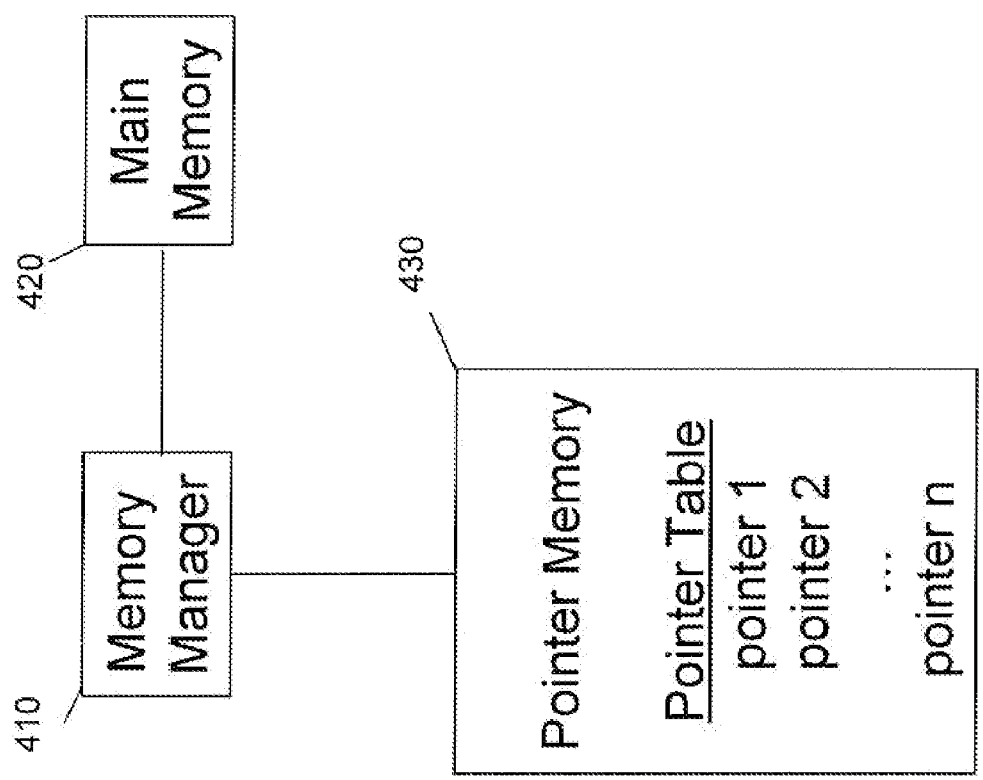
FIG. 4 is a block diagram showing a memory manager, a main memory, and a pointer table stored in a pointer memory.

FIG. 1 illustrates a case in which the data blocks all have the same length l. They are memorized randomly in available areas whose length corresponds to a multiple of the block length to be memorized. For example, if the blocks all have a length of 10 bytes, they can be distributed at random in positions of 10, 20, 30, 40, etc. bytes. The available area can be bigger than the block to be memorized. For example, a block of 10 bytes B8 can be placed in a space e2 of 30 bytes and with an offset of 20 bytes with regard to the beginning of the available area, namely at 20 bytes from the preceding block B5.

During the storage of a new block Bn, according to the first variant of the invention, the memory manager will explore the memory and will deduce the available addresses from there e1, e2, 1, e2, 2, e3 and e4 understanding that space e2 allows storing two blocks of fixed length. Once these addresses are determined, a random variable can be used to define the address of the available area where block Bn will be stored.

According to the second variant, the manager finds 5 available areas whose length corresponds to those of the blocks to be stored. A random selection of a number between 1 and 5 gives 3, the block Bn will therefore be stored in the third area, namely, in e2, 2.

According to the third variant, the maximum number of available areas Z is 13. The manager randomly determines a number N between 1 and 13, for example 8, afterwards it explores the memory to find the eighth available area. A first run reveals that there are 5 available areas and a second run from the beginning determines that position e2, 2 (the third) corresponds to the eighth area. In brief, if the determined random number N is greater than the number of available places P, the position of the free space is defined by the random number N modulo the number of available places P. Here, in the example, N=8 is bigger than P=5, so the block will be stored in position 8 modulo 5=3rd place. In the particular case where N modulo P is equal to 0, the block can be situated in the first or last position. According to another variant, the random number N can be defined again until obtaining a value N modulo P different from zero.

FIG. 2a) represents the case in which the blocks have a variable length and are separated or not by free areas. For example a block B2 of 20 bytes begins at 5 bytes from the preceding block and ends 5 bytes before block B4. The areas or free spaces e1 and e2 before and after B2 can be occupied if B2 and B4 must be replaced, for example. It is the same for all the other free spaces that are either occupied or that move during the storage of new blocks Bn instead of the preceding ones.

A new block Bn can be stored in the remaining free spaces or substitute one or several of the blocks still present that are no longer useful. In this way the freed space allows the storage of several smaller blocks or a bigger block that occupies all or part of the space. Figures b) and c) show an example of updating: a new block B12 has been stored in the free space e4. Block B10 is replaced by a bigger block B11 that, therefore, occupies all the freed space e9 between B7 and B9. Blocks B2 and B4 have been replaced by B13 that occupies half of the freed space e10. The new free space e11 created in this way will be used during the next storage of blocks.

According to another variant of the invention illustrated in FIG. 3, the program determines a usual length m of the data blocks to memorize. This value can correspond to the most frequent length of blocks or, in certain cases, to the average length of the blocks. After random selection of the available storage area, the block will be memorized either directly after an already present block, in the case where the block has an equal or longer length than said length m, or with an offset of n bytes in order that the length of the block and the offset n is equal to the length m. This variant allows, after the deletion of this block, freeing a space that will be used very quickly. Without this offset foreseen at the time of storage, the position freed by this block will have very little chance to be used again.

According to our example, the normal length m of the blocks is 15 bytes; the blocks have lengths that vary between 5 and 20 bytes. Two cases are shown:

If the length of the block Bn to be stored is smaller than the current length m, Bn is stored at a pitch m starting from the preceding block in order to leave a free space equal to the difference between m and the length of Bn. According to the example above, a block of 10 bytes is placed at 15−10=5 bytes from the previous block. FIG. 3a) shows blocks separated by available areas. In FIG. 3b) a block B6 is stored in the free space e2, the length of B6 being smaller than the current length m, B6 is placed at a pitch m starting from the preceding block B2. The space e5 between B2 and B6 is equivalent to the difference of length between m and the length of B6.

If the length of the block Bn to be stored is greater or equal to the current length m, Bn is placed immediately after the preceding block. In FIG. 3b) B7 is bigger that the value m and is placed therefore in e4 after B5 without leaving any free space between them.

The method according to the invention can also be applied to more important memories that have a structure in form of a table or matrix that allows direct access to the data blocks. In such a case some pointers define the positions available in the memory. The latter are chosen randomly before storage of the data blocks in the memory.

The data from which the blocks have been stored according to the method of the invention can be reconstructed by analysis, either the identifiers contained in the headings of the blocks or the addresses of each block contained in a previously memorized table.

In one embodiment of the invention, as illustrated in FIG. 4, the table that contains the direct access pointers is contained in a second secured pointer memory 430. In this way, it is possible that the main memory 420 is unsecured such as a memory of a computer and that the pointer table is stored in a security module (a smart card or similar element). Each data block comprises an identifier that will be transmitted to the card eventually along with the size of the data. In exchange, the memory manager 410 on the card randomly determines a pointer among the free pointers as described previously and returns this pointer to the host computer. In parallel, the card stores the data identifier along with the pointer value.

It is noted that it is possible to avoid storing the identifier with the data block in the main memory, this information being found only in the secured memory. Storing the blocks without their identifier in the main memory will then prevent any identification of these blocks through an analysis of the memory.

In the case of reading, the identifier is transmitted to the card that searches for the corresponding pointer in its secured memory; a pointer that will be returned to the host computer to accede to the data blocks in the main memory.

In this way, each main memory content is unique and cannot be transported from one computer to another. It must compulsorily be accompanied by the security element that stores the pointer table.

The invention claimed is:

1. A method for storing a data block, the method comprising:
    determining a plurality of available memory areas in a digital, re-writable semiconductor memory controlled by a memory manager;
    randomly selecting an available memory area from among the plurality of available memory areas; and
    storing the data block in the selected available memory area.

2. The method of claim 1, wherein the determining step is performed once and the randomly selecting step and the storing step a performed a plurality of times for a plurality of data blocks.

3. The method of claim 1, wherein a result of the determining step constitutes a list with addresses of the available memory areas stored temporarily in a second memory, and wherein an address is chosen randomly from said list and the data block is stored in the area of the memory indicated by the randomly chosen address.

4. The method of claim 1, wherein a number between 1 and the number of available memory areas is randomly determined and used to select the available memory area where the block is stored.

5. The method of claim 1, wherein a number N between 1 and the maximum number of available memory areas is randomly determined, and wherein the the $N^{th}$ available area is searched for and, if the end of the memory is reached before finding said $N^{th}$ area, the search is restarted from the beginning of the memory until the $N^{th}$ available area is reached.

6. The method of claim 1, wherein the data block is of variable length, and wherein the data block is stored in an available memory area of a length equal to or longer than a length of the data block.

7. The method of claim 1, wherein the data blocks are all the same length, the available memory areas having a length equal to or longer than a multiple of the length of the blocks.

8. The method of claim 1, further comprising the step of determining a usual length of data blocks to be memorized, wherein a data block of a shorter length than said usual length is stored at an offset from a start of the selected available memory area in order to leave a free space preceding the data block in the selected available memory area, the free space being equal to the difference between the usual length and a length of the data block, and where a data block of equal length or longer than the usual length is stored at the start of the selected available memory area.

9. The method of claim 1, wherein the memory is with direct access to the data through a pointer table, said pointers being chosen randomly before the storage of the data blocks in the memory.

10. The method of claim 9, wherein the pointer table is stored in a secured memory different from the main memory, each pointer being associated to an identifier of the data block.

11. The method of claim 10, wherein said different secured memory is located in a removable security module.

12. The method of claim 11, wherein the removable security module is a smart card.

13. A system for storing a data block, the system comprising:
 a semiconductor memory, the semiconductor memory being a digital, re-writable memory; and
 a memory manager connected to the semiconductor memory;
 wherein the memory manager is configured to perform the steps of
  determining a plurality of available memory areas in the semiconductor memory;
  randomly selecting an available memory area from among the plurality of available memory areas; and
  storing the data block in the selected available memory area.

14. The system of claim 13, wherein the memory manager is further configured to select a second available memory area from among the plurality of available memory areas identified in the determining step and store a second data block in the second available memory area.

15. The system of claim 13, wherein a list of available memory areas is generated and stored in a second memory different from the semiconductor memory in the determining step, and wherein an address is chosen randomly from the list and the data block is stored in die of the memory indicated by the randomly chosen address.

16. The system of claim 13, wherein a number between 1 and the number of available memory areas is randomly determined and used to select the available memory area when the data block is stored.

17. The system of claim 13, further comprising the step of:
 determining a usual length of data blocks to be stored in the semiconductor memory;
 wherein a data block of a shorter length than said usual length is stored at an offset from a start of the selected available memory such that a free space precedes the data block in the selected available memory area, the free space being equal to the difference between the usual length and a length of the data block precedes the data block, and
 wherein a data block of equal length or a length longer than the usual length is stored at the start of the selected available memory area.

18. The system of claim 13, further comprising:
 a second memory including a pointer table, the second memory being different from the semiconductor memory;
 wherein the pointer table includes a plurality of pointers that point to available memory areas identified in the determining step.

19. The system of claim 18, wherein the second memory is housed in a removable security module.

20. The system of claim 19, wherein the removable security module is a smart card.

* * * * *